Dec. 1, 1931.  T. HASHIMOTO  1,834,837
STEAM PRESSURE COOKER
Original Filed Sept. 19, 1928
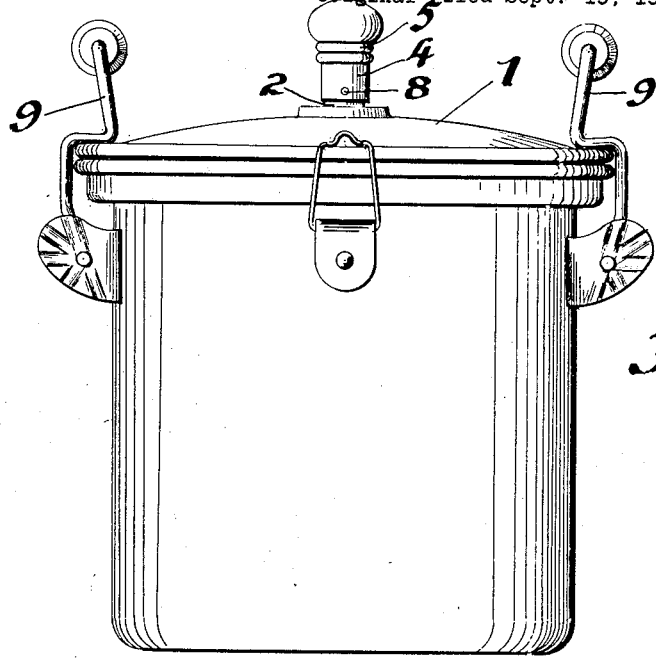
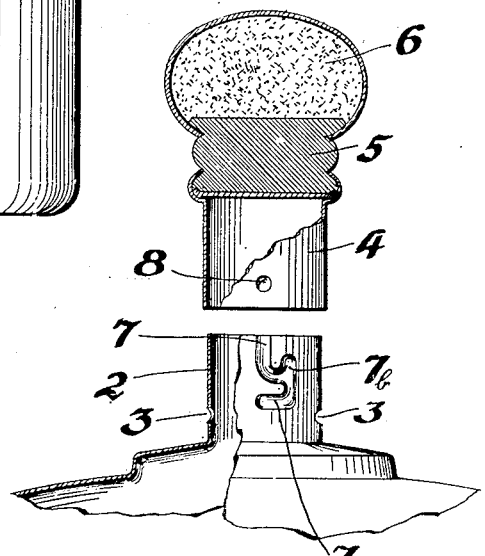
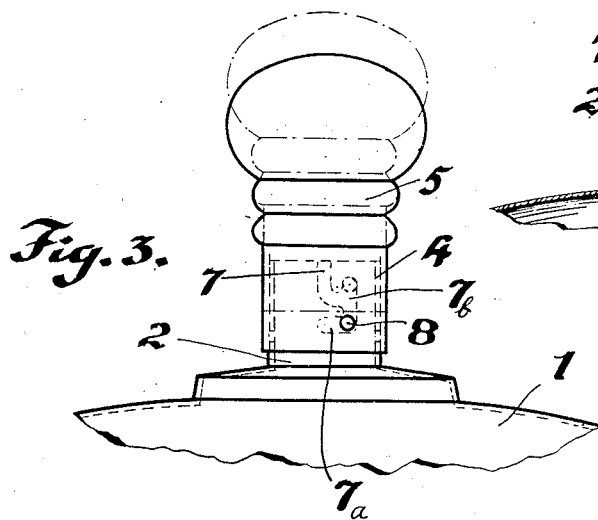
Inventor
Takichi Hashimoto.
by Connolly Bros
Attys Patented Dec. 1, 1931

1,834,837

UNITED STATES PATENT OFFICE

TAKICHI HASHIMOTO, OF KAMAKURA-CHO, KANAGAWA, JAPAN

STEAM PRESSURE COOKER

Original application filed September 19, 1928, Serial No. 306,996. Divided and this application filed August 29, 1930. Serial No. 478,767.

This application is a division of application No. 306,996 filed September 19th, 1928, upon which Patent No. 1,765,072, has been granted.

This invention relates to the improvements in steam-pressure cookers and has for its object a cooker having an outlet for steam which opens automatically by a predetermined steam pressure. The construction of my invention consists mainly of the following parts to wit; firstly, a lid having a cylinder (hereinafter called lid-cylinder) fixed at its centre through which it projects outside and has two holes or exhaust openings and a groove, the latter of which made partly horizontal, partly vertical and both in a contiguous line, and secondly a handle of the lid (hereinafter called lid handle) consisting of a knob and cylinder fixed together with a piece of ebonite between them, of which the former has a weight inside and the latter has a projecting point inside so that when the knob is turned till the projected point engages or fits into the horizontal part, of the lid-cylinder, both cylinders are formed into one body with the lid-cylinder and when it is so turned as to engage, or fit into the vertical part, the openings or holes of the lid-cylinder become free or exposed, thus serving as a safety-valve or exhaust-passage of steam.

The annexed drawings illustrate an example of the application of my invention. Fig. 1 is the front view of the cooker. Fig. 2 is a front view of the lid-handle showing its upper part cut away, Fig. 3 is the front view of the lid-handle and the dotted line shows its position when forced up by steam pressure.

To describe in detail the construction of the cooker, the lid 1 has at its centre a straight lid cylinder 2 projecting outside which has around and outside a curved groove or channel 7 and also hole or holes 3 for steam to escape. The said cylinder 2 is so made as to form one body with the cylinder 4 of the lid-handle when both are fitted between the top of the lid-cylinder, and beneath the knob, a piece of ebonite 5 or other non-conductible material is fitted. In the hollow of the knob, cement or similar materials 6 are filled for the purpose of a weight so that so long as the steam pressure of the cooker does not exceed a certain degree the lid-handle is prevented from being pushed up or lifted. The curved groove 7 of the lid cylinder is made of two parts, horizontal $7_a$ and vertical $7_b$ to both of which a small projecting point 8 inside the cylinder part of lid-handle is made to fit, in such a way that when the said point 8 is in the horizontal section $7_a$ of the groove 7 the lid-cylinder becomes as one body with the lid itself and when the handle is so turned as to fit the point 8 into the vertical groove $7_b$ and left in that position as shown in Fig. 3 the lid-handle is forced up by pressure of the steam when it is high enough to overcome the resistance of weight contained in the knob part of the handle. With the forcing up of the lid-handle as described by dotted line in Fig. 3, steam hole or holes 3 become exposed and the steam is allowed to escape, thereby serving as a safety-valve. The method of using the steam-pressure cooker of my invention is to tightly close the body of the cooker with the lid by the action of the body-handles 9, to turn the lid-handle by the knob in such a way that the projection in its cylinder part should fit into the perpendicular section of the groove in the lid-cylinder, and to boil or steam food or other material in a usual way. The peculiar advantage of this cooker lies in the fact that the pressure of steam in the vessel is kept under a predetermined degree and that whenever the pressure exceed the said degree, the lid-handle automatically works as a safety-valve.

Having thus described my invention, what I claim is:

1. A cooker comprising a body, a lid therefor having a tubular extension providing an outlet to the atmosphere for said cooker, said extension having a lateral opening adjacent to its lower end, a weighted knob having a tubular extension adapted for telescoping over the tubular extension of the lid, and co-operative groove and pin means whereby the knob has free upward movement to permit uncovering the lateral opening in said extension for said lid and whereby said weighted knob may be interlocked with the tubular extension of the lid, to prevent vertical movement of the weighted knob, when desired.

2. A cooker comprising a body, a lid therefor, means for clamping the lid against being lifted from the cooker body, a weighted handle for the lid, and co-operative means between the lid and weighted handle whereby a predetermined steam pressure within the cooker will lift the weighted handle and open an outlet from the cooker to the atmosphere and means whereby the weighted handle and the lid may be interlocked against movement of the former relatively to the lid.

In testimony whereof I have affixed my signature.

TAKICHI HASHIMOTO.